United States Patent [19]
Gray et al.

[11] Patent Number: 5,178,429
[45] Date of Patent: Jan. 12, 1993

[54] PIPELINE RECOVERY HEAD

[75] Inventors: David A. Gray, Cypress, Tex.; Walter E. Gray, Jr., Santa Barbara, Calif.

[73] Assignee: Diverless Systems, Inc., Houston, Tex.

[21] Appl. No.: 729,069

[22] Filed: Jul. 12, 1991

[51] Int. Cl.$^5$ ............................................. F16L 1/00
[52] U.S. Cl. ...................................... 294/93; 294/94
[58] Field of Search ............... 294/93, 94, 96, 86.24, 294/86.25, 66.1; 405/173

[56] References Cited

U.S. PATENT DOCUMENTS

| | | | |
|---|---|---|---|
| 2,984,513 | 5/1961 | Nearman | 294/93 X |
| 3,751,932 | 8/1973 | Matthews, Jr. | |
| 3,777,499 | 12/1973 | Matthews, Jr. | |
| 3,842,612 | 10/1974 | Arnold | 294/96 X |
| 3,961,493 | 6/1976 | Nolan, Jr. et al. | |
| 3,972,554 | 8/1976 | Tryon | 294/97 |
| 4,245,861 | 1/1981 | Harry et al. | 294/94 |
| 4,320,915 | 3/1982 | Abbott et al. | 294/96 |
| 4,400,112 | 8/1983 | Castel et al. | 405/224 |
| 4,445,804 | 5/1984 | Abdallah et al. | 405/173 |
| 5,044,827 | 9/1991 | Gray et al. | 405/173 |

FOREIGN PATENT DOCUMENTS

| | | | |
|---|---|---|---|
| 852761 | 8/1991 | U.S.S.R. | 294/93 |

Primary Examiner—Charles A. Marmor
Assistant Examiner—Joseph D. Pape
Attorney, Agent, or Firm—Pravel, Gambrell, Hewitt, Kimball & Krieger

[57] ABSTRACT

A recovery head for use in retrieving a submerged pipeline to the water surface. The recovery head includes a center of gravity arm attached to one end of the recovery head by a connecting pin. The center of gravity arm maintains the recovery head in a level orientation to allow divers or an ROV to more easily insert the head into the pipeline. After insertion into the pipeline, the center of gravity arm is removed from the recovery head. With the center of gravity arm removed, the recovery head does not obstruct or interfere with any steps involved in the actual retrieval and securing of the pipeline on the lay barge. The rear portion of the recovery head includes two T-posts which connect to oval links attached to the end of a retrieving cable. The links are such that, when placed over the T-posts and the retrieval cable is pulled to retrieve the pipeline to the surface, the links rotate. In this manner, the links are unable to slip off of the T-posts on the recovery head while the recovery head is being pulled to the water surface.

13 Claims, 4 Drawing Sheets

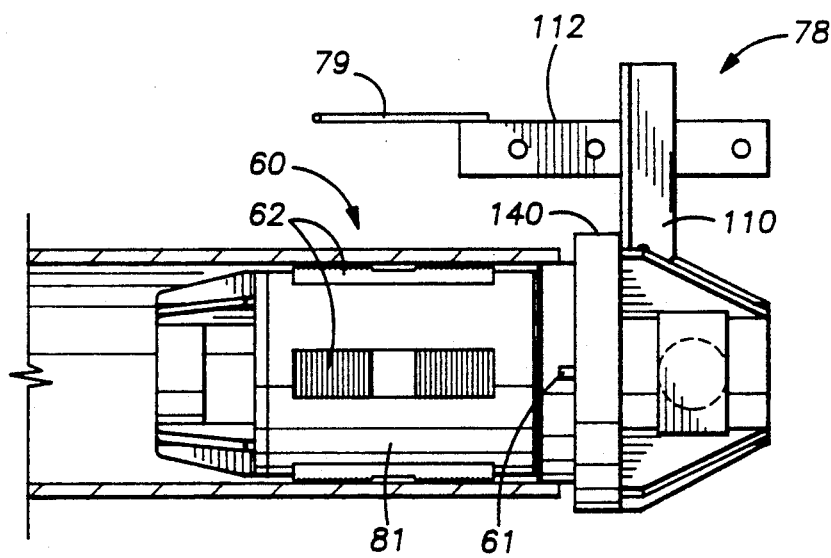
FIG. 6
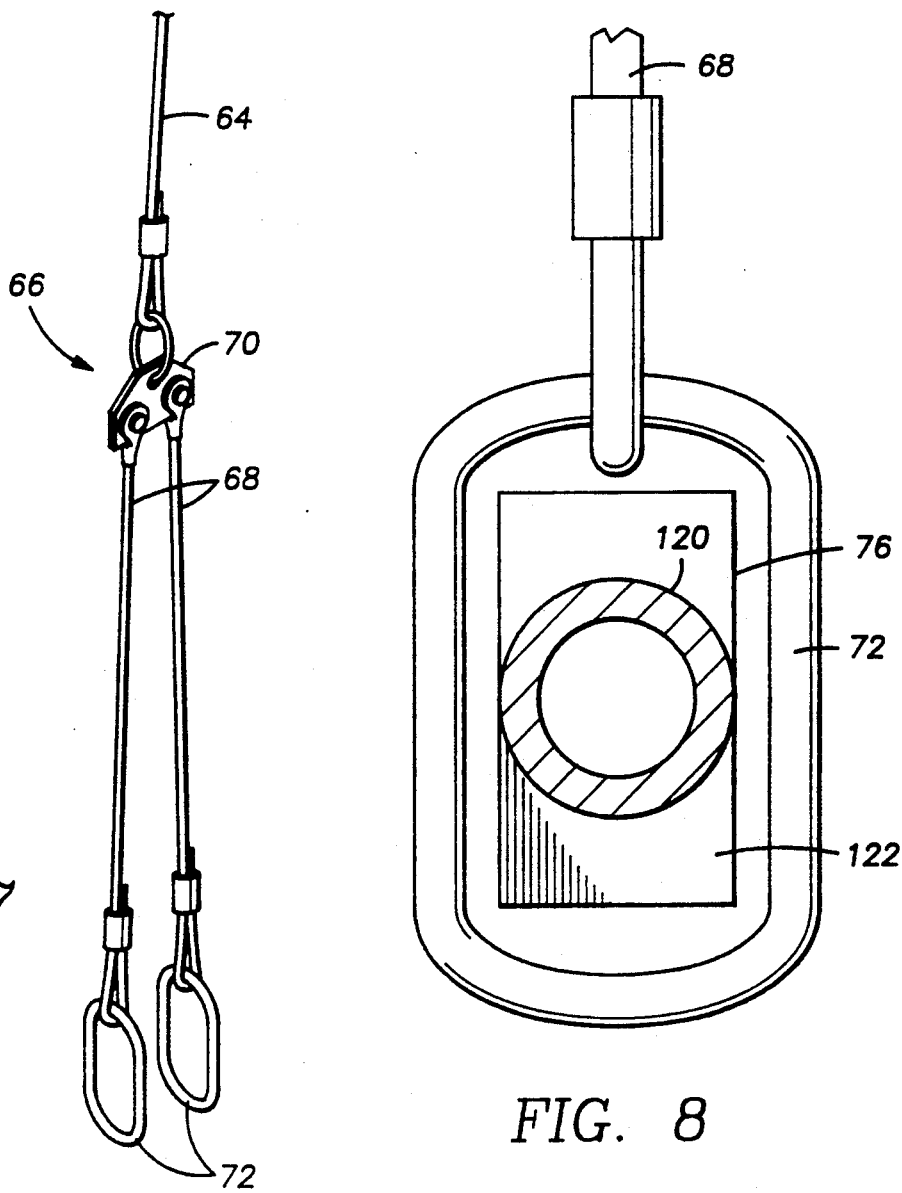
FIG. 7
FIG. 8

PIPELINE RECOVERY HEAD

BACKGROUND OF THE INVENTION

1. Field of the Invention

The present invention relates to the retrieval of submerged pipelines, and more particularly to an improved recovery head for recovering wet buckled pipe.

2. Description of the Related Art

Marine pipelines are typically laid on the sea floor from floating vessels called lay barges. To install a submerged pipeline, joints of pipe are welded together on the lay barge. The end of the first joint of pipe is sealed to prevent water from filling the pipeline as the pipeline is laid. As the joints of pipe are welded together into a continuous length of pipeline, the lay barge is moved forward in the water and the welded pipeline slides on pipeline rollers on the lay barge, then over a stinger which is attached to the stern of the lay barge and into the water. As the pipeline leaves the lay barge and the stinger, it bends under its own weight and assumes a generally S-shaped configuration between the stern of the lay barge and the sea floor. The stinger is an extended support which limits the bending of the pipeline between the lay barge and the sea floor, thus reducing the potential of the pipeline buckling as it is being laid. Pipeline tensioners on the deck of the lay barge grip the pipeline and further reduce the bending of the pipeline as it is being laid.

During pipe lay operations, loss of tension in the pipeline due to adverse weather or to failure of the tensioners can cause the pipeline to bend excessively. Excessive bending of the pipeline may cause the pipeline to buckle. If the buckle results in water entering the pipeline it is referred to as a "wet buckle." The submerged pipeline will fill with water, with the pipeline breaking at a location, generally near the stinger, and fall to the sea floor. A pipeline can also be damaged after the pipeline has been laid, for example, by ships dragging their anchors over the pipeline.

Normally, to repair a submerged pipeline which has buckled and broken or has been damaged, the broken or damaged end of the pipeline needs to be lifted to the water surface so that the pipeline can be repaired. The depth of the water typically determines whether or not the pipeline end will be recovered using divers or diverless vehicles. Conventional pipeline recovery techniques using divers are restricted to maximum depths of about 300 meters. In water depths which exceed 300 meters, the typical recovery method utilizes a remotely operated vehicle (ROV) which is controlled by operators from a vessel on the water surface. Regardless of the water depth, the typical recovery method involves cutting the pipeline at the sea floor and then inserting a lift or recovery head into the open end of the pipeline section that is to be raised to the water surface. A retrieval cable is then attached to the lift head, which is then drawn in by a winch on the lay barge to raise the pipeline end to the water surface. In deep water, the ROV manipulates cutting equipment to sever the damaged pipeline and then inserts the lift head into the open end of the pipeline section that is to be raised to the water surface.

It is desirable that the recovery head be both stable and maneuverable to enable divers or the ROV to more easily manipulate the recovery head into the pipe end. In addition, the manner in which the retrieval cable is attached to the recovery head must be relatively simple to allow an ROV to easily attach the cable to the recovery head. This is especially important in the case of a large or heavy retrieval cable where the ROV is unable to easily manipulate the cable. Also, the attachment must be relatively secure to guarantee that the pipe end can be raised to the surface without incident.

When the recovery cable is reeled into the lay barge, the pipe end is retrieved onto the stinger and then onto the pipe ramp and into the grasp of the pipeline tensioners on the lay barge. It is generally desirable for the recovery head to be not greater in diameter than the pipeline so that the recovery head does not obstruct or interfere with any steps involved in the actual retrieval and securing of the pipeline on the lay barge.

The recovery heads currently in use generally do not include any type of stabilization mechanism to allow an ROV to more easily manipulate the recovery head into the pipe end. In addition, it is desirable that any stabilization mechanism added to a recovery head not interfere with the actual retrieval and securing of the pipeline on the lay barge. Also, the recovery heads used in the prior art generally include a hole in the rear end of the head to which a hook may be attached to retrieve the head to the water surface. It has been found to be difficult for an ROV to manipulate the hook into the hole provided in the recovery head. Hence, a simplified mechanism for attaching a retrieval cable to a recovery head is needed.

Therefore, an improved recovery head is needed which is stable and maneuverable such that the head can be easily inserted into the pipeline. The retrieval cable must be easily attached to the recovery head and must also be secure to enable the recovery head and pipeline to be easily pulled to the surface. In addition, the recovery head must be such that the retrieved end can be directly pulled onto the stinger and into the grasp of the pipeline tensioners, with the recovery head small enough to pass through the tensioners on the lay barge.

SUMMARY OF THE INVENTION

The present invention comprises a recovery head for use in retrieving a submerged pipeline to the water surface. The recovery head of the present invention includes a center of gravity arm attached to one end of the recovery head by a connecting pin. The recovery head is lowered to the ocean floor by a recovery cable attached to the center of gravity arm. The center of gravity arm maintains the recovery head in a level orientation to allow divers or an ROV to more easily insert the head into the pipeline. After insertion into the pipeline, slips located on the recovery head are locked into the inside diameter of the pipe by an external torque wrench applied to a fitting on one end of the recovery head. The connecting pin is preferably removed from the recovery head before the head is retrieved to the surface, thereby removing the center of gravity arm from the recovery head. With the center of gravity arm removed, the recovery head is sufficiently small in diameter so that the recovery head does not obstruct or interfere with any steps involved in the actual retrieval and securing of the pipeline on the lay barge.

Once the recovery head is locked into the pipeline, a retrieval cable from the lay barge is lowered to retrieve the recovery head and the pipeline to the surface. The rear portion of the recovery head includes two T-posts according to the present invention. The retrieval cable includes two master links attached to the end of the cable which are placed over the T-posts. The master links are preferably oval in shape and fit over a rectangular portion of the T-posts. When the master links have been placed over the T-posts and the retrieval cable is pulled to retrieve the pipeline to the surface, the master links rotate. In this manner, the master links are unable to slip off of the T-posts on the recovery head while the recovery head is being pulled to the water surface. When the recovery head and pipeline are recovered onto the lay barge, the master links may be rotated back to remove the links from the T-posts.

BRIEF DESCRIPTION OF THE DRAWINGS

A better understanding of the present invention can be obtained when the following detailed description of the preferred embodiment is considered in conjunction with the following drawings, in which:

FIG. 6 is a view of the activated recovery head in the severed end of the pipeline;

FIG. 7 is a view of a retrieval cable and bridle assembly including master links used for recovery of the recovery head;

FIG. 8 s a side view of one of the master links in FIG. 6 before it is placed over a T-post;

DETAILED DESCRIPTION OF THE PREFERRED EMBODIMENT

The present invention relates to a recovery head for recovering wet buckled pipe from the sea floor in any depth of water. It is to be understood that the recovery head can be used with divers or with remotely operated vehicles (ROV's).

Figure 1:
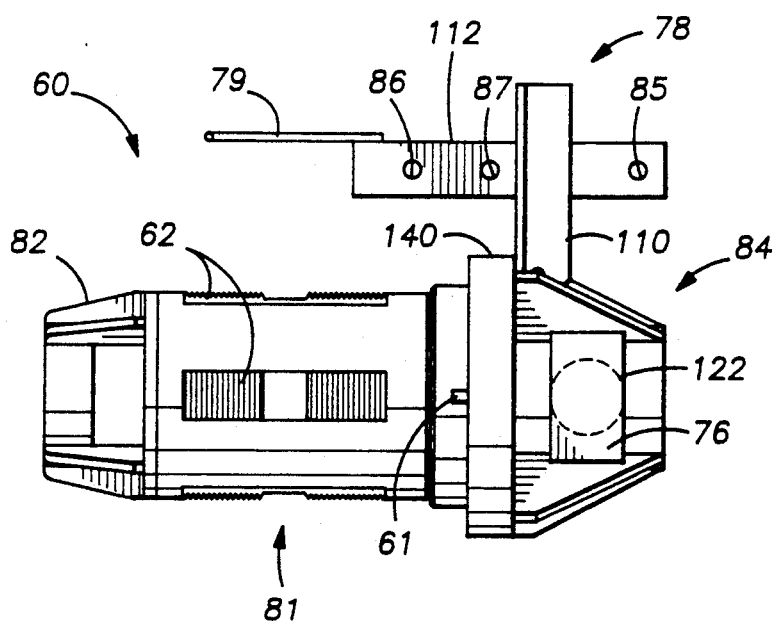
FIG. 1 is an elevation view of the recovery head according to the present invention.
Figure 2:
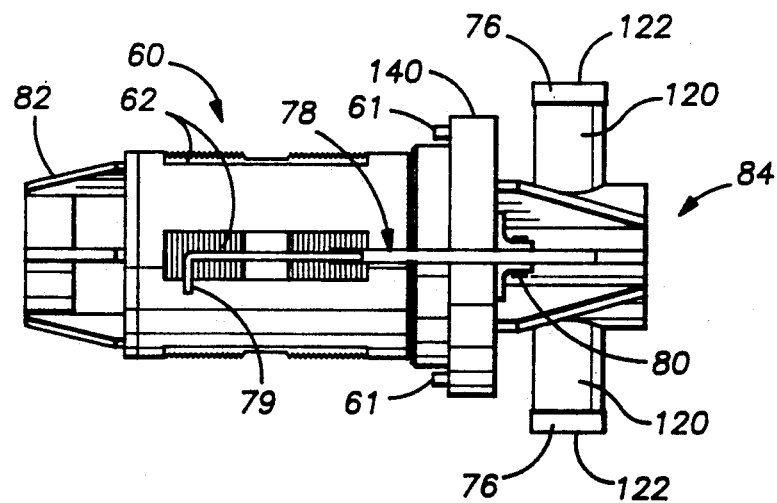
FIG. 2 is a top view of the recovery head of FIG. 1.
Figure 3:
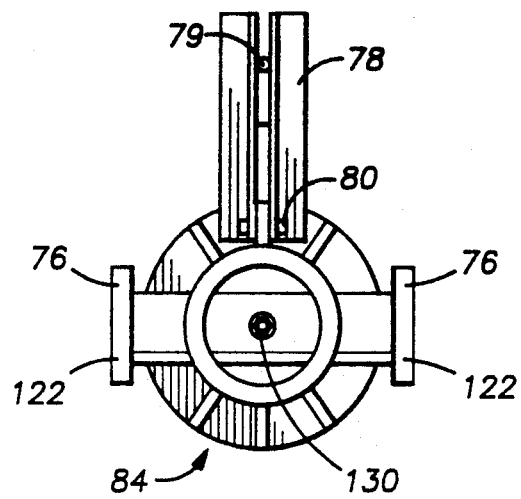
FIG. 3 is an end view of the recovery head of FIG. 1.

Referring now to FIGS. 1, 2, and 3, the recovery head 60 according to the present invention is shown. The recovery head 60 includes a rear section 84 for attachment of a retrieval cable for retrieval of the recovery head 60 to the water surface and a slip module 81 having a front section 82 for non-binding insertion into a pipeline. The rear section 84 of the recovery head 60 includes a base plate 140 which forms a stop to prevent the rear section 84 of the recovery head from being inserted into the pipeline. The diameter of the slip module 81 is preferably based on the diameter of the pipe to be retrieved, with the front section being slightly smaller to allow non-binding insertion into the pipe. The slip module 81 is preferably removable from the rear section 84. The rear section 84 is designed such that this portion mates with varying sizes of slip modules for maximum versatility. In the preferred embodiment, slip modules designed to retrieve pipelines varying in diameter from 8" to 24" may be attached to the rear section 84.

Figure 4:
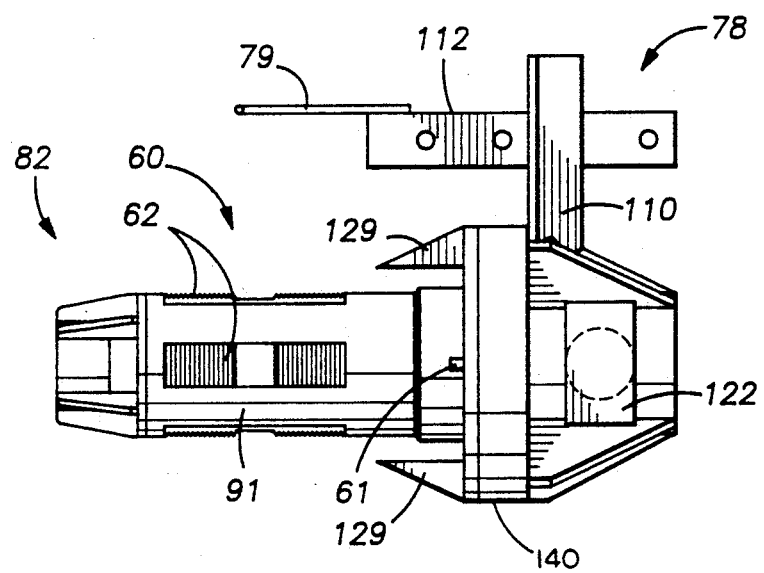
FIG. 4 is an elevation view of an alternate recovery head for use with smaller diameter pipe than the recovery head of FIG. 1.

Referring now to FIG. 4, a diagram illustrating the rear section 84 connected to a slip module 91 with a diameter smaller than the diameter of the base plate 140 and smaller than the slip module 81 shown in FIGS. 1, 2, and 3 is shown. In this embodiment a rear gusset assembly 129 is connected to the base plate 140 to compensate for the smaller diameter of the slip module 91 The rear gusset assembly 129 compensates for the step created between the smaller diameter slip module 91 and the base plate 140. In this manner, when the recovery head 60 is recovered to a lay barge on the ocean surface, the diameter of the recovery head 60 is fairly uniform to allow the recovery head 60 to easily pass through tensioners on the lay barge.

Referring again to FIGS. 1, 2 and 3, the rear section 84 of the recovery head 60 according to the present invention includes two T-posts 76. It is noted that more than two T-posts may be used, or, alternatively, only one T-post may be used. The T-posts 76 are each comprised of a cylindrical post 120 which extends from the rear section 84 of the head 60 and an end piece 122 which is attached in a perpendicular fashion to the post 120. The end pieces 122 on each of the T-posts are preferably rectangular in shape and are adapted to receive oval links 72 (FIGS. 6–9) attached to the end of the retrieval cable for retrieval of the recovery head 60 and pipeline to the water surface. The recovery head 60 is preferably constructed such that no welds transmit the very high loads caused by retrieval of the pipeline. The rear section 84 and the slip module 81 are preferably designed such that critical load paths are transmitted either by bolts in tension, or by shear pins or shear rings. Therefore, the T-posts 76 can accommodate the very high loadings in shear without any of the welds carrying the tension loads. The slip module 81 includes slip 62 which may be expanded outward from the recovery head 60 by applying an external torque wrench (not shown) to a fitting 130 (FIG. 3) on the rear section 84 of the recovery head 60. The slip module 81 is generally a conventional unit utilized in pipeline operations. The fitting 130 is preferably a specially configured hex nut for ease of blind and manipulator stabbing of a socket over the nut. The nut drives an internal lead screw (not shown) which in turn drives a spider (not shown) which drives the slips 62 up an inclined plane to contact the inside diameter of the pipe.

Figure 5:
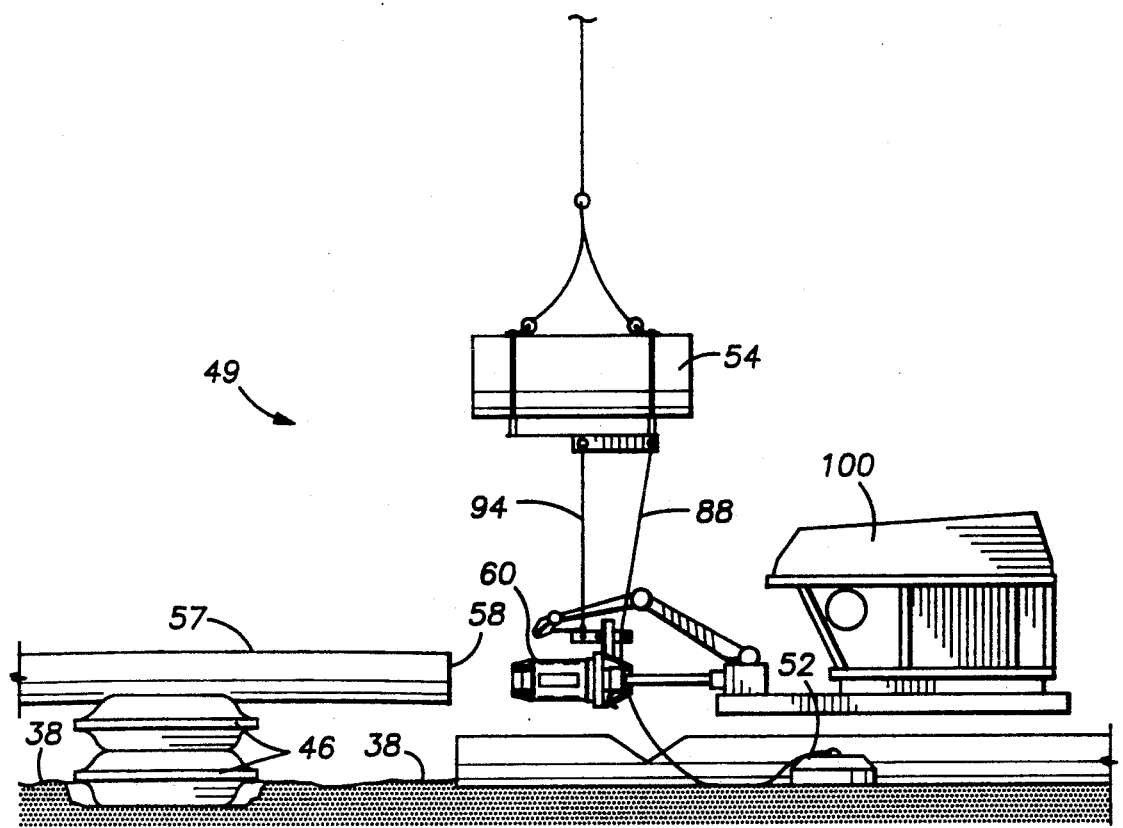
FIG. 5 is an elevation view illustrating the deployment and insertion of a recovery head in a severed end of the pipeline.

The recovery head 60 according to the present invention includes a center of gravity arm 78 connected to the rear section 84 of the recovery head 60 by a connecting pin 80. The center of gravity arm 78 includes a normal arm portion 110 extending normal to the longitudinal axis of the recovery head 60. A parallel arm portion 112 is connected to the normal arm portion 110 a distance from the recovery head 60. The parallel arm 112 includes a number of holes 85, 86, 87 for attachment of various cables. The hole 86 is preferably for attaching a recovery head cable 94 (FIG. 5) to enable the recovery head 60 to be easily lowered to the ocean floor. The hole 86 is preferably located over the center of gravity of the recovery head 60 to maintain the head 60 at a level orientation and allow the recovery head 60 to be easily lowered to the ocean surface. In addition, the level orientation of the recovery head 60 provided by the center of gravity arm 78 allows the head 60 to be more easily inserted into the pipeline. The parallel arm 112 includes a bar 79 extending from the arm 112 out over the slip module 81. The bar 79 is used by a remote operated vehicle (ROV) to aid in maneuvering the recovery head into a pipeline, as shown in FIG. 5. The center of gravity arm 78 may be easily removed by removing the connecting pin 80. The center of gravity arm 78 is preferably removed after the recovery head 60 is inserted into the pipeline.

The recovery head 60 includes spacers 61 (FIGS. 1 and 2) connected to the base plate 140 and projecting out toward the slip module 81. The spacers 61 preferably provide a 1" gap between the base plate 140 and the end of the pipe when the slip module is inserted into the pipeline, as shown in FIG. 6. The openings and the spacers 61 permit water passage from the front section 82 to the rear section 84 of the recovery head 60 under design flow (pigging velocity) conditions. Once the recovery head 60 is inserted into one end of the pipeline, a pig is forced through the pipeline from the other end to disgorge water through the openings and the spacers 61 in the recovery head 60 and out of the pipeline.

Referring to FIG. 5, an illustration of the deployment and insertion of the recovery head 60 in the severed end of a pipeline 57 is shown. The method described below is for illustration only, and it is noted that the recovery head 60 may be used with any of the various methods for retrieving a pipeline to the surface. The pipeline 57 preferably includes a cut end 58 to the left of where the offending crimp or break in the pipeline occurs. The pipeline 57 is then preferably raised above the ocean surface by lift bags 46. This method is more fully described in co-pending application Ser. No. 07/605,642, filed Oct. 30 1990, now U.S. Pat. No. 5,044,827, which is hereby incorporated by reference.

The recovery head 60 is next launched in a three-piece launch assembly 49 which includes a clump weight 52, the recovery head 60, and a buoyancy module 54. The clump weight 52 is suspended from the lower side of the buoyancy module 54 by a clump weight cable 88. The recovery head 60 is suspended from the lower side of the buoyancy module 54 by the recovery head cable 94 which is attached to hole 86. The length of the clump weight cable 88 is greater than the length of the recovery head cable 94, so that the clump weight 52 is the first to reach the sea floor 38. The clump weight 52 is lowered to the sea floor 38 and the ballast of the buoyancy module 54 is trimmed so that the recovery head 60 and buoyancy module 54 are nearly neutral. In this manner, the recovery head 60 is nearly weightless, thus allowing for easy maneuverability by the ROV 100.

The ROV 100 mates with the recovery head 60 and flies the recovery head 60 into the clean cut pipe end 58. The recovery head cable 94 attached to the center of gravity arm 78 maintains the recovery head 60 in a level position relative the pipeline 58, thus allowing the ROV 100 to more easily maneuver the head 60 into the pipeline 57. As shown in FIG. 6, the slips 62 located on the recovery head 60 are then locked into the inside diameter of the pipe 57 by an external torque wrench (not shown) manipulated by the ROV 100. The external torque wrench is applied to the fitting 130 (FIG. 3) on the rear section 84 of the recovery head 60 to extend the slips 62 outward against the inside diameter of the pipeline 57, as shown in FIG. 6. Once the recovery head 60 has been inserted into the pipeline 57 and the slips 62 set, the recovery head cable 94 is preferably cut with a wire rope cutter (not shown) located on the ROV 100, thus releasing the buoyancy module 54. Once the slips 62 have been set the buoyancy module 54 is recovered back to the surface, counterbalanced by the clump weight 52.

Before the end 58 of the pipeline 57 is raised to the water surface, the pipeline 57 is preferably de-watered or voided of any fluids by a pipeline pig to reduce the weight of the pipeline 57 being raised to the water surface.

A recovery cable 64 is then lowered from the water surface to retrieve the recovery head 60 and pipeline 57. As shown in FIG. 7, a recovery bridle assembly 66 is connected to the end of the recovery cable 64. The recovery bridle assembly 66 includes a pair of bridle cables 68 connected at one end to a bridle cables 68 connected at one end to a bridle plate 70 and terminating at the other end with master links 72. The bridle cables 68 are preferably lighter and more flexible than the recovery cable 64 to provide easier maneuverability of the master links 72 by the ROV 54. Each master link 72 also preferably includes a buoyancy block (not shown) attached to support each master link 72 to allow easier mobility.

Figure 9:
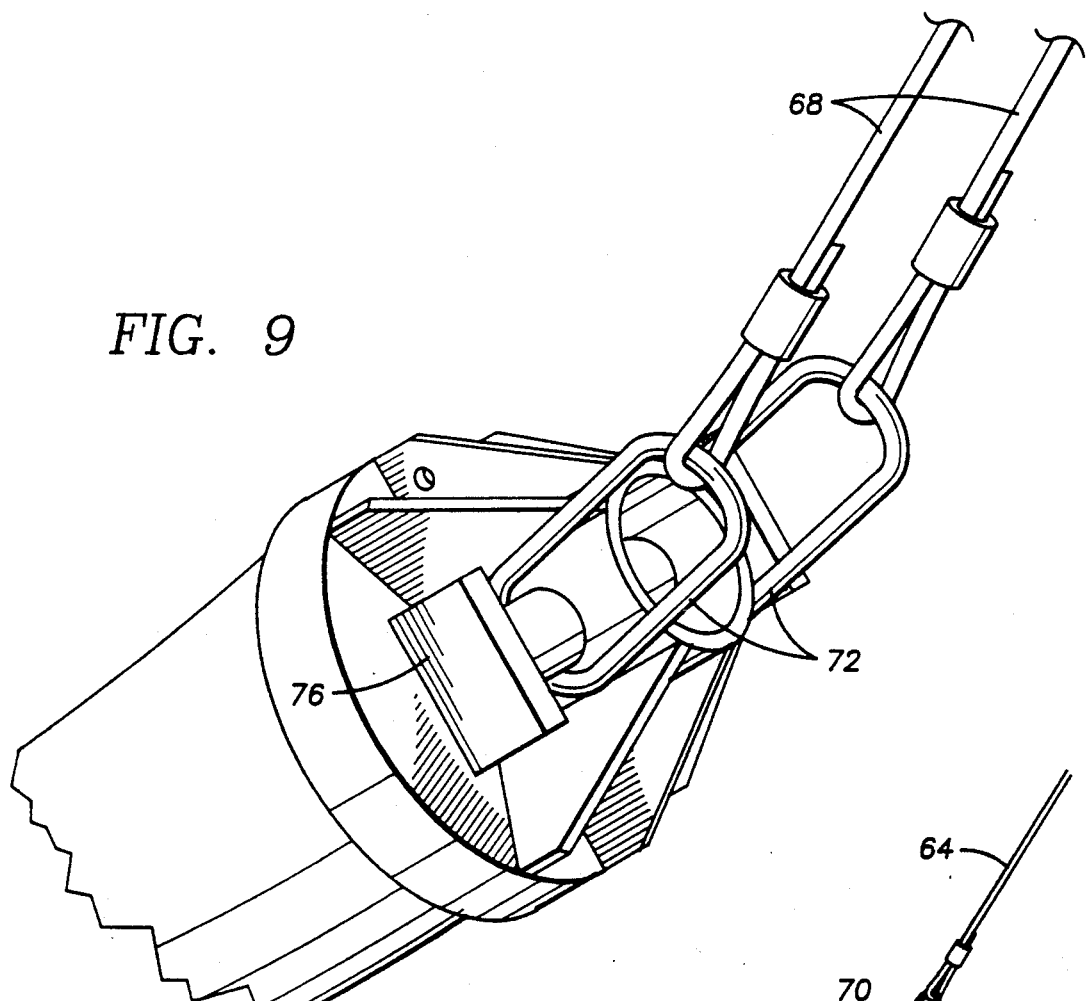
FIG. 9 is a view of the master link of FIG. 7 after having been placed over the T-post and rotated.
Figure 10:
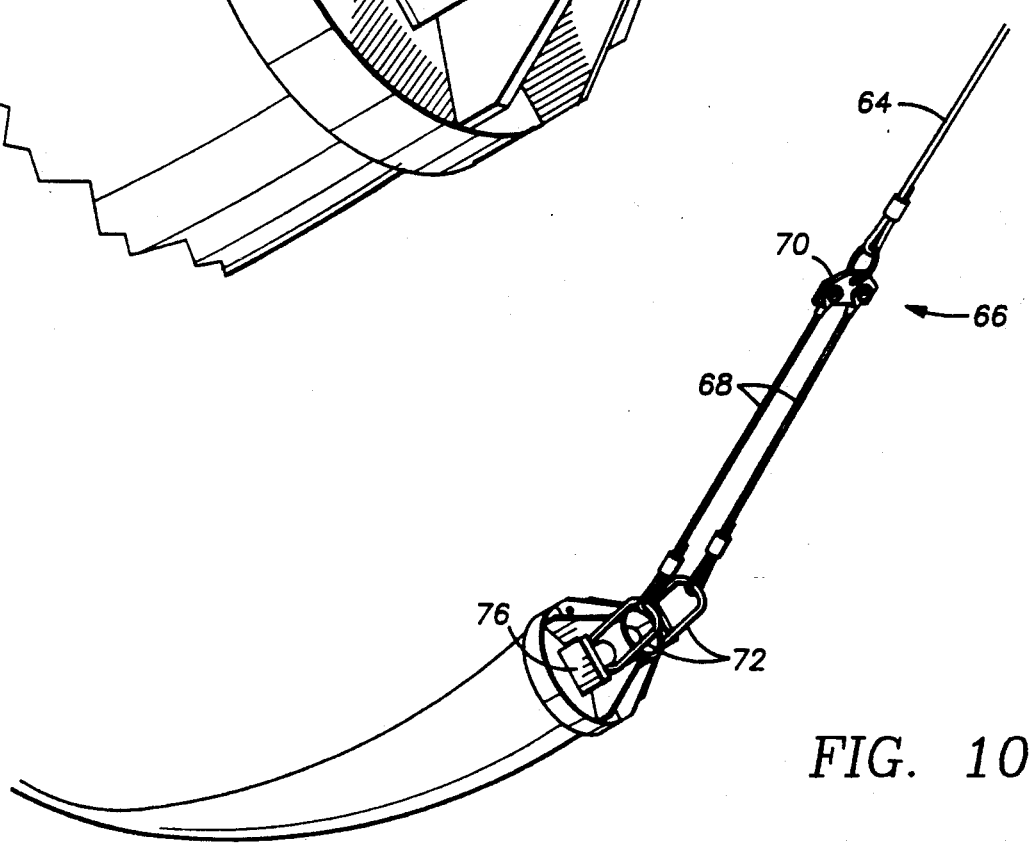
FIG. 10 is a perspective view of the master links on the retrieval cable connected to T-posts on the recovery head according to the present invention.

The ROV 100 is preferably equipped with a utility winch (not shown), which is utilized to pull the bridle plate 70 and the recovery cable 64 to the recovery head 60. The center of gravity arm 78 is preferably used as a reaction point for the ROV 100 to enable the utility switch on the ROV 100 to more easily pull the recovery cable 64 and the bridle plate 70 to the end of the pipeline 58. The ROV 100 then places the master links 72, one at a time, over the T-posts 76 on the recovery head 60. As shown in FIG. 8, each master link 72 is oval in shape and fits over the rectangular end piece 122 of the T-post 72. Once the master links 72 are properly placed over the T-posts 76 on the recovery head 60, the buoyancy blocks on the master links 72 are cut free. The connecting pin 80 is then removed by the ROV 100, separating the center of gravity arm 78 from the recovery head 60. As explained below, with the center of gravity arm 78 removed, the recovery head 60 does not appreciably obstruct or interfer with tensioners on the lay barge. The recovery cable 64 is then reeled into the lay barge 20. As the recovery cable 64 is reeled in and becomes taut, the master links 72 rotate, as shown in FIG. 9. Because the T-post end pieces 122 are rectangular, and the links 72 are oval, with the inner spacing of the links 72 being close to the size of the T-post end pieces 122, as the head 60 is recovered, links 72 rotate on the cylindrical post portion 120, thus ending alignment between the oval link 72 and the rectangular end piece 122. In this manner, the master links 72 are unable to slip off of the T-posts 76 as long as the retrieval cable 64 remains taut, as shown in FIG. 10. It is noted generally the pipeline and the recovery cable 64 are parallel because of the tension forces involved, but for illustration purposes a greatly exaggerated angle has been shown.

The recovery cable 64 retrieves the pipe end 58 onto the pipe ramp and into the grasp of pipeline tensioners on the lay barge. It is important to note that the recovery head 60, with the center of gravity arm 78 and connecting pin 80 having been removed at the sea floor 38, does not obstruct or interfere with any steps involved in the actual- retrieval and securing of the pipeline 57 on the lay barge, allowing the pipeline to be retrieved smoothly, without numerous stops or intermediate steps once the actual recovery has begun. As previously noted, if the slip module 91 has a substantially smaller diameter than the base plate 140, then the gusset assembly 129 is preferably used to compensate for the difference in diameter. When the recovery head 60 is on the lay barge and past the tensioners, the links 72 are rotated into alignment and removed and the slips 62 are released, allowing the recovery head 60 to be removed.

Therefore, the present invention comprises a recovery head used in retrieving submerged pipelines. The recovery head includes a center of gravity arm which maintains the recovery head in a level orientation to allow an ROV or divers to more easily maneuver the head into the pipeline. The recovery head also includes T-posts which connect to mating links on a retrieval cable to allow a more secure attachment of the retrieval cable to the recovery head. When the retrieval cable is attached to the recovery head and is pulled into the lay barge, the links rotate to secure the attachment of the retrieval cable to the recovery head.

It should be understood that the invention comprises a recovery head for use in retrieving a submerged pipeline, and the invention should not be unduly limited to the foregoing set forth for illustrative purposes. Various modifications and alterations of the invention will be apparent to those skilled in the art without departing from the true scope of the invention.

We claim:

1. A pipeline recovery head for use in retrieving pipelines, the recovery head comprising:
   a rear section adapted to be located outside of the pipeline, said rear section having a diameter substantially the same as the pipeline;
   a cylindrical body member connected to said rear section adapted to be inserted into the end of a pipeline; and
   one or more T-posts projecting normally from said rear section, each T-post having a post portion having a first end connected to said rear section and a second end connected to an end piece that is perpendicular to said post portion, said end piece being generally rectangular.

2. The pipeline recovery head of claim 1, wherein said cylindrical body member includes slip means for locking said recovery head to the pipeline.

3. The pipeline recovery head of claim 2, wherein said slip means includes a drive connection extending through said recovery head rear section to a location accessible when said recovery head is located in the pipeline.

4. The pipeline recovery head of claim 1, wherein said cylindrical body member includes a base member located between said cylindrical body member and said rear section for preventing said rear section from being inserted into the end of the pipeline.

5. The pipeline recovery head of claim 4, wherein said cylindrical body member is removable from the pipeline, and wherein said cylindrical body member has a diameter approximately equal to the diameter of the pipeline to be retrieved.

6. The pipeline recovery head of claim 5, wherein said cylindrical body member has a diameter smaller than the diameter of said base member, the recovery head further comprising:
   a gusset assembly connected to said base member that is situated concentrically around said cylindrical body member.

7. A pipeline recovery system for use in retrieving pipelines using a recovery cable, the system comprising:
   a recovery head having a cylindrical body member having a front section adapted to be inserted into the end of a pipeline and a rear section adapted to be located outside of the pipeline, said front section having a diameter approximately equal to the diameter of the pipeline, the rear section having one or more T-posts projecting normally from the rear section, each T-post having a post portion with a first end connected to said rear section and a second end connected to an end piece which is perpendicular to said post portion, the end piece being generally rectangular; and
   a recovery bridle assembly having bridle cables corresponding to each of said T-posts, each bridle cable having first and second ends and including an oval link at said bridle cable first end, each said oval link being sized so that the interior of said oval link fits over said corresponding T-post end piece when the oval is aligned with the rectangle of said end piece and does not fit over said T-post end piece when unaligned, and a bridle plate, said bridle plate receiving said second end of each bridle cable and the recovery cable.

8. The pipeline recovery system of claim 7, wherein said front section includes slip means for locking said recovery head to the pipeline.

9. The pipeline recovery system of claim 8, wherein said slip means includes a drive connection extending through said recovery head rear section to a location accessible when said recovery head is located in the pipeline.

10. The pipeline recovery system of claim 9, wherein said recovery head includes a hole in said rear section and further comprises:
    a center of gravity arm for connection to said recovery head, said arm having a first portion including first and second ends, said first portion first end having a hole used for connecting to said recovery head rear section, said first portion being substantially perpendicular to said recovery head when connected; and a second portion having an end connected to said second end of said first portion, said second portion being substantially parallel to said recovery head when said first portion first end is connected to said recovery head rear portion, said second portion including a hole located substantially above the center of gravity of said recovery head when said recovery head is in a horizontal position, said second portion hole being sized to allow attachment of a cable; and
    a connecting pin for insertion in said holes in said recovery head rear section and said center of gravity arm first portion, said pin being easily removable from said holes.

11. The pipeline recovery system of claim 7, wherein said cylindrical body member includes a base member located between said cylindrical body member and said rear section for preventing said rear section from being inserted into the end of the pipeline.

12. The pipeline recovery head of claim 4, wherein said cylindrical body member is removable from the pipeline, the wherein said cylindrical body member has a diameter approximately equal to the diameter of the pipeline to be retrieved.

13. The pipeline recovery system of claim 12, wherein said cylindrical body member has a diameter smaller than the diameter of said base member, the recovery head further comprising:
    a gusset assembly connected to said base member that is situated concentrically around said cylindrical body member.

* * * * *